Patented Dec. 1, 1936

2,062,344

UNITED STATES PATENT OFFICE 2,062,344

PROCESS FOR THE PREPARATION OF ALIPHATIC ACID HALIDES

Peter J. Wiezevich and Per K. Frolich, Elizabeth, N. J., assignors to Standard Oil Development Company, a corporation of Delaware No Drawing. Application August 1, 1931, Serial No. 554,594

13 Claims. (Cl. 260—123)

This invention relates to improvements in the preparation of acid halides, and more particularly to the preparation of aliphatic acid halides from carbon monoxide or its derivatives.

With a preferred embodiment in mind, but without intention to limit the invention more than is required by the prior art, the method comprises treating carbon monoxide or its halogen derivatives with an alkyl halide at a temperature of approximately 300° to 900° C. in the presence of a heat conducting material which is substantially inert to the reaction, to form the corresponding aliphatic acid halide. By alkyl halide is meant any member of the alkyl series in combination with fluorine, chlorine, bromine or iodine, such as methyl chloride, dichlormethane, ethyl chloride, ethyl bromide, or the like.

More specifically, the invention involves in carrying the reaction under heat transfer conditions so effective as to obtain a high reaction efficiency in the neighborhood of 76%, with a resulting low loss of acid halide to byproducts. This efficient transfer of heat is obtained by contacting the reaction mixture with a good inert heat conducting material having a thermal conductivity of over 50 B. t. u. per hour per square foot per °F. per foot. It may also be obtained by bubbling the reaction mixture through a molten salt inert to the reaction so as to obtain intimate contact.

The reaction may be carried out in metallic tubes, composed of copper, aluminum, brass, or any other metal or alloy which resists the action of the products of the reaction and which has a melting point above 300° C. According to Schack (Goldschmidt-Partridge) Industrial Heat Transfer, John Wiley & Sons (1933) p. 341, these materials have the following thermal conductivities:

|  | Temp. °F. | k B. t. u./hr./sq. ft./°F./ft. |
|---|---|---|
| Aluminum | 32 | 116.3 |
| Brass | 68 | 53.1 |
| Copper | 68 | 223.1 |

Iron and nickel have been found detrimental unless they are heavily alloyed with copper, aluminum, or any of the other metals or alloys specified above. It has been found possible to use iron or nickel tubes having an inner lining of some substantially inert material such as copper, brass, cement, fire-clay, and the like. Another method of effecting the reaction consists in bubbling the reacting gases through a bath of molten metal or salt. In this case the material may have a melting point below 300° C. For instance, a short time of contact and very good heat transfer are obtained when the gases are bubbled through molten borax, copper chloride, or any other salt which does not volatilize appreciably at the temperature of reaction. The molten material is preferably contained in a steel vessel having an inner lining of cement, fire-clay, quartz, or the like.

The reaction may be carried out under pressure greater than atmospheric, and as high as 500 atmospheres. In some cases it has been found advantageous to do this since at the higher pressures, a much lower reaction temperature may be employed in order to obtain yields of acid halides corresponding to those obtained at atmospheric pressure.

The invention is not limited to the separate alkyl halides, since any mixture of halides may be made to react with carbon monoxide or derivatives of carbon monoxide, such as phosgene, carbonyl sulfide, and the like.

The gaseous products leaving the reactor are cooled through heat exchangers and a condenser and then passed countercurrently to a solvent which absorbs the products which are normally liquid at room temperatures. Such solvents may be hydrocarbons such as kerosene, or they may be chlorinated products such as carbon tetrachloride, esters, ethers, or any other liquids which are not reactive with acid chlorides or hydrochloric acid. Higher boiling acid halides may be used as solvents also. It has been found advisable to keep the solvent at as low a temperature as possible and to keep it as free from water as possible, since otherwise the acid chlorides will react with the water. In an alternative procedure the acid halide withdraw from the reaction zone can be recovered by causing it to react with such material as cellulose, alcohols, or other materials reactive towards acid halides.

It has also been found possible, especially when the reaction is carried out under pressure, to liquefy the alkyl halide and the products of the reaction, separate the gaseous carbon monoxide, and to fractionate the alkyl halide and products under pressure. A liquid solvent may be introduced while the materials leaving the reactor are under pressure, so as to obtain a better recovery of the products.

The process is generally accompanied by side reactions which result in the formation of some hydrogen chloride, water, and sometimes carbon. For instance, in the case of the reaction of methyl chloride with carbon monoxide, under proper conditions the main reaction is presumably the following:

$$CO + CH_3Cl \rightarrow CH_3COCl$$

However, some acetic acid, hydrochloric acid, ethylene and carbon are generally found, indicating that side reactions occur probably as follows:

$$2CH_3Cl \rightarrow 2HCl + C_2H_4$$

$$CH_3Cl + CO \rightarrow H_2O + HCl + 2C$$

$$CH_3COCl + H_2O \rightarrow CH_3COOH + HCl$$

Long times of contact of the gases in the reaction zone favor the side reactions, so that it is necessary to have as low a time of contact as possible. At the lower temperatures, longer times of contact can be tolerated than at the higher temperatures. Therefore, in the separation of the products, steps must be taken to separate the acetyl chloride from the hydrochloric and acetic acids. This is generally accomplished by fractionation, the hydrogen chloride being bled from the receiver as a gas and absorbed in water. A corrosion resistant vessel is preferable at this point.

The ratio of carbon monoxide and alkyl halide in the inlet gas may be altered. It has been found in the case of methyl chloride that the best results have been obtained with a ratio 3 parts of carbon monoxide to one part of methyl chloride. Generally, an excess of carbon monoxide is desirable.

After the products are removed from the gases leaving the reaction chamber, the resulting gases may be recirculated, the correct proportions of the reactive gases being first adjusted. Ethylene may be removed before the gas is recirculated, by means of absorption or reaction with some material such as hypochlorous acid, or any other substance which reacts with ethylene.

As an example, a mixture of one part of methyl chloride and three parts of carbon monoxide was forced through a steel tube having an inner lining of copper. With a time of contact of the methyl chloride of 0.29 second, and with the reactor at 860° C., acetyl chloride was produced with an efficiency of 74% based on the methyl chloride.

Likewise, dichloromethane and carbon monoxide at 700° C. reacted to give malonyl chloride, presumably according to the reaction:

$$CH_2Cl_2 + 2CO \rightarrow CH_2(COCl)_2$$

In this case about 15% of the dichloromethane decomposed was recovered as malonyl chloride.

At 750° C. ethyl bromide was made to react with carbon monoxide to yield propionyl bromide.

At 1700 lbs. per sq. in. pressure and 500° C., carbon monoxide and methyl chloride reacted to give acetyl chloride. This compound was recovered by passing the reacted gases through a solvent such as "Varsol", and distilling off the acetyl chloride from the solvent. "Varsol" is a petroleum distillate having an approximate boiling range of between 300° F. and 400° F.

In another form of carrying out the invention, a mixture of carbon monoxide, an aliphatic hydrocarbon such as methane, and a halogen such as chlorine, bromine, or iodine are introduced into the reactor. The gases leaving the reactor were then treated by methods previously described in order to recover the acid chlorides.

In still another form of carrying out the invention, phosgene and an aliphatic hydrocarbon such as methane were caused to react under similar conditions to yield acid chlorides.

It has been found that with larger reaction tubes, it is preferable to introduce particles of heat conducting material such as copper, brass, etc. These serve mainly as contact masses and afford better heat distribution to the reacting gases.

Various changes may be made within the scope of the appended claims in which it is desired to claim all novelty inherent in the invention as broadly as the prior art permits, without any limitation as to the mechanism of the reactions involved.

We claim:

1. The process of producing aliphatic acid halides, which comprises reacting together a material selected from the group consisting of carbon monoxide, phosgene and carbonyl sulfide, and a material selected from the group consisting of halogenated lower aliphatic hydrocarbons and substances capable of forming same under the reaction conditions, at a temperature between the approximate limits of 300 and 900° C. in the presence of a metal harmless to the reaction, with a contact time not substantially longer than that corresponding to 0.3 seconds at 860° C. for reacting carbon monoxide with methyl chloride to form acetylchloride.

2. The process according to claim 1 carried out by reacting together carbon monoxide, lower aliphatic hydrocarbons, and a halogen.

3. The process of producing aliphatic acid halides, which comprises reacting carbon monoxide with halogenated lower aliphatic hydrocarbons, at a temperature between the approximate limits of 300 and 900° C. in the presence of a metal harmless to the reaction, with a contact time not substantially longer than that corresponding to 0.3 seconds at 860° C. for reacting carbon monoxide with methyl chloride to form acetylchloride.

4. Process according to claim 3 in which an excess of carbon monoxide is used.

5. Process according to claim 3 carried out at a temperature between the approximate limits of 700 and 900° C.

6. Process according to claim 3 carried out in a metal tube.

7. Process according to claim 3 carried out by bubbling the reactants through a molten metal bath.

8. Process according to claim 3 carried out at super-atmospheric pressure.

9. Process according to claim 3 in which the resultant aliphatic acid halide product is recovered by absorption in a solvent.

10. Process according to claim 3 in which the resultant aliphatic acid halide product is recovered by contacting the reaction products with a material reactive with the acid halide product.

11. The process according to claim 3 carried out continuously by continuously feeding carbon monoxide and halogenated lower aliphatic hydrocarbons into the reaction zone, continuously removing reaction products therefrom, continuously separating aliphatic acid halides from the other reaction products and recirculating at least a part of said other reaction products.

12. Process according to claim 3 in which an excess of carbon monoxide is reacted with a lower alkyl halide at a temperature between the approximate limits of 700 and 900° C.

13. The process of producing acetylchloride, which comprises reacting about three parts by volume of carbon monoxide with about one part by volume of methylchloride at about 860° C. in the presence of a metal harmless to the reaction, with a contact time of about 0.3 second.

PETER J. WIEZEVICH.
PER K. FROLICH.